United States Patent
Donizetti et al.

(10) Patent No.: US 12,070,880 B2
(45) Date of Patent: Aug. 27, 2024

(54) THREE-AXIS ROTATIONAL MOULDING MACHINE

(71) Applicant: PERSICO S.P.A., Nembro (IT)

(72) Inventors: Gaetano Donizetti, Nembro (IT); Claudia Persico, Nembro (IT)

(73) Assignee: PERSICO S.P.A. (IT)

( * ) Notice: Subject to any disclaimer, the term of this patent is extended or adjusted under 35 U.S.C. 154(b) by 174 days.

(21) Appl. No.: 17/996,789

(22) PCT Filed: Apr. 20, 2021

(86) PCT No.: PCT/IT2021/050121
§ 371 (c)(1),
(2) Date: Oct. 21, 2022

(87) PCT Pub. No.: WO2021/220317
PCT Pub. Date: Nov. 4, 2021

(65) Prior Publication Data
US 2023/0166429 A1    Jun. 1, 2023

(30) Foreign Application Priority Data
Apr. 30, 2020 (IT) .................. 102020000009556

(51) Int. Cl.
*B29C 41/06* (2006.01)
*B29C 41/04* (2006.01)
(Continued)

(52) U.S. Cl.
CPC ............ *B29C 41/06* (2013.01); *B29C 41/042* (2013.01); *B29C 41/38* (2013.01); *B29C 41/46* (2013.01);
(Continued)

(58) Field of Classification Search
CPC ..... B29C 41/04; B29C 41/042; B29C 41/045; B29C 41/047; B29C 41/06
See application file for complete search history.

(56) References Cited

U.S. PATENT DOCUMENTS 2,967,329 A   1/1961   Friedland et al.
3,909,179 A   9/1975   Chujoo et al.
(Continued)

FOREIGN PATENT DOCUMENTS

CN   106493891 A   3/2017
CN   109382953 A   2/2019
(Continued)

*Primary Examiner* — Atul P. Khare

(57) ABSTRACT

Rotational moulding machine (1) comprising a fixed frame (2), a support arm (3) comprising a first (4) and a second portion (5) rigidly joined together, the support arm (3) being rotationally fixed to the fixed frame (2) only at the first portion (4) to rotate about a first axis of rotation (101) substantially horizontal, a movable frame (6) rotationally fixed to the support arm (3) to rotate about a second axis of rotation (102) substantially perpendicular to the first axis of rotation (101), the movable frame (6) comprising a supporting portion (7) lying in a plane substantially perpendicular to the second axis of rotation (102), and an actuation system (8) rigidly fixed to the movable frame (6) at the supporting portion (7) and structured to secure a mould (20) and rotate the mould (20) about a third axis of rotation (103) substantially perpendicular to the second axis of rotation (102).

14 Claims, 4 Drawing Sheets

(51) Int. Cl.
*B29C 41/38* (2006.01)
*B29C 41/46* (2006.01)
*B29C 41/52* (2006.01)

(52) U.S. Cl.
CPC ........ *B29C 41/52* (2013.01); *B29C 2791/002* (2013.01)

(56) References Cited

U.S. PATENT DOCUMENTS

| | | |
|---|---|---|
| 4,956,135 A | 9/1990 | Payne |
| 5,022,838 A | 6/1991 | Payne |
| 5,188,845 A | 2/1993 | Payne |
| 5,503,780 A | 4/1996 | Payne |
| 2006/0022365 A1 | 2/2006 | Mazabraud et al. |
| 2014/0272256 A1* | 9/2014 | Langheld ................ B29C 41/20 264/114 |
| 2015/0375430 A1 | 12/2015 | Persico et al. |

FOREIGN PATENT DOCUMENTS

| | | | |
|---|---|---|---|
| CN | 109571835 A | 4/2019 | |
| CN | 208841682 U | 5/2019 | |
| CN | 209504691 U | 10/2019 | |
| CN | 209533973 U | 10/2019 | |
| GB | 1254090 A | 11/1971 | |
| WO | WO-9841377 A1 * | 8/1998 | ............. B29C 41/06 |

* cited by examiner ns of the two innermost frames of the series, which must be suitably sized to allow complete rotation of the mould.

Therefore, in order to use larger moulds, it is necessary to increase the dimensions of these frames and, therefore, of the respective rotational moulding machine, incurring higher manufacturing and/or operation and/or labour costs, which generally increase as the dimensions of the machine itself increases (e.g. larger footprint, greater weight, greater energy consumption for the operation of the machine).

The Applicant has therefore faced the problem of being able to use moulds for a rotational moulding machine having dimensions variable over a wide range, while keeping unchanged and limited the overall encumbrances of the machine.

According to the Applicant, the above problem is solved by a rotational moulding machine according to the attached claims and/or having one or more of the following features.

According to an aspect the invention relates to a rotational moulding machine. The machine comprises:
- a fixed frame;
- a support arm comprising a first and a second portion rigidly joined together, said support arm being rotationally fixed to said fixed frame only at said first portion to rotate about a first axis of rotation (substantially) horizontal, wherein said second portion develops protruding from the first portion (substantially) parallelly to said first axis of rotation;
- a movable frame rotationally fixed to said support arm (only) at said second portion to rotate about a second axis of rotation (substantially) perpendicular to said first axis of rotation, said movable frame comprising a supporting portion which lies in a plane (substantially) perpendicular to said second axis of rotation;
- an actuation system rigidly fixed to said movable frame at said supporting portion, said actuation system being structured to secure a mould and rotate said mould about a third axis of rotation (substantially) perpendicular to said second axis of rotation.

According to the Applicant the support arm rotationally fixed to the fixed frame only at the first portion to rotate about the first substantially horizontal axis of rotation, wherein the second portion extends protruding from the first portion substantially parallel to the first axis of rotation, in addition to giving to the mould, in use, the first rotational degree of freedom, allows the second portion of the support arm to be arranged substantially cantilevered with respect to the fixed frame. In this way the second portion allows to support the further elements of the machine fixed in series to it (i.e. movable frame, actuation system and, in use, the mould) without at the same time circumscribing the space intended for these further elements.

In fact, the support arm, thanks to the second portion protruding from the first portion, describes an open profile allowing the aforementioned further elements fixed to it to be able to protrude with respect to the first and/or second portion in width and/or length and/or height, to make that the overall dimensions of these further elements are not limited by those of the support arm, but they can be comparable with respect to, if not even globally greater than, the support arm.

The movable frame, rotationally fixed to the support arm at the second portion to rotate about the second axis of rotation perpendicular to the first axis of rotation, gives, in use, the second degree of rotational freedom to the mould. The supporting portion of the movable frame which lies in the plane perpendicular to the second axis of rotation allows to support the actuation system and the mould without at the

THREE-AXIS ROTATIONAL MOULDING MACHINE

TECHNICAL FIELD OF THE INVENTION

The present invention relates to a three-axis rotational moulding machine.

STATE OF THE ART

Rotational moulding is a moulding technology typically used to make finished products typically of plastic material comprising an inner cavity either open, i.e. in communication with the environment outside the finished product, or closed, i.e. without the aforesaid communication. Objects typically made using rotational moulding technology are for example: parts of motor vehicles (e.g. roofs for trucks, tractors, etc.), boats (e.g. kayaks), tanks/cisterns (e.g. for fuels, for water, etc.), bins, vases, street furniture, toys, garden furniture, etc.

The rotational moulding process typically comprises providing a mould having an inner cavity suitably countershaped to the geometry of the finished product to be made. The mould is loaded with the raw plastic material, typically in powder form, and then closed. The mould, once firmly secured to a rotational moulding machine, is rotated about two axes of rotation (typically mutually perpendicular) and simultaneously subjected to a thermal heating cycle (for example by means of an oven in which the mould is placed, by means of electrical resistances arranged on the external surface of the mould, by means of a heat transfer fluid flowing in suitable channels made in the walls of the mould, etc.).

The rotation of the mould allows to distribute the plastic material in fluid form (e.g. powder) along the whole useful surface extension of the inner cavity of the mould, in order to cover the whole useful inner surface of the mould with at least one layer of polymeric material. At the same time, the heating of the mould allows the raw polymeric material to melt and sinter, and thus adhere to the inner surface of the mould, reproducing its shape.

Subsequently the mould is cooled, opened and the finished product is then extracted.

In the context of rotational moulding processes, documents U.S. Pat. Nos. 188,845B1, 5,022,838B1 and 4,956,135B1 describe rotational moulding machines comprising three or more axes of rotation of the mould.

SUMMARY OF THE INVENTION

In the aforesaid context of the rotational moulding processes, the Applicant has felt the need to make, in a single rotational moulding process, finished products with complex geometries and/or wide extension along one or more of the respective development directions.

In this context, the Applicant has realized that known rotational moulding machines have some drawbacks and/or can be improved in one or more aspects.

For example, the rotational moulding machines described in US188845B1, U.S. Pat. No. 5,022,838B1 and U.S. Pat. No. 4,956,135B1 comprising a plurality of closed frames arranged in series one inside the other, limit, for a given physical dimension of the whole machine, the free inner volume intended to accommodate the mould. In fact, this free inner volume is determined, in first instance, by the same time introducing, thanks to the planar shape, any constructive limitation to the shape and/or to the size of these elements. The planar supporting portion, for example, does not limit the extension of the actuation system and/or of the mould moving away from the supporting portion itself, i.e. in height, nor the extension of these elements in length and/or width, which can therefore protrude from the supporting portion.

Finally, the actuation system as described above provides, in use, the third rotational degree of freedom of the mould.

In this way it is possible to provide the mould with three rotational degrees of freedom while limiting the progressive reduction of the useful volumes (contrary to the progressive reduction of the dimensions of the concentric frames shown in the aforementioned documents US188845B1, U.S. Pat. No. 5,022,838B1 and U.S. Pat. No. 4,956,135B1), and therefore of the mould, as such rotational degrees of freedom increase, and even cancelling this reduction out (e.g. providing the machine with moulds having dimensions substantially comparable at least with those of the movable frame).

The terms "horizontal", "vertical" are used with reference respectively to a direction parallel to, and to a direction perpendicular to, a plane supporting the machine in normal operating conditions.

By "substantially horizontal/vertical" with respect to an element of the machine it is meant that this element forms an angle of 0°+/−15° with the horizontal/vertical direction, preferably of 0°+/−10°.

By 'substantially perpendicular" with respect to geometric elements (such as straight lines, planes, surfaces etc.) it is meant that these elements form an angle of 90°+/−15°, preferably of 90°+/−10°.

By 'substantially parallel' with respect to the aforementioned geometric elements it is meant that these elements form an angle of 0°+/−15°, preferably of 0°+/−10°.

The present invention in one or more of the above aspects may have one or more of the following preferred features.

Preferably said support arm has a substantially L-shaped profile. In this way the support arm has a simple shape keeping the second portion protruding with respect to the first.

The present invention comprises any shape of the support arm, for example wherein the first and the second portion are rectilinear and connected to each other to form a right angle, or wherein at least one portion (e.g. the second portion) has an arc shape or with contiguous segments, without prejudice to the fact that the second portion protrudes from the first portion developing substantially parallel to the first axis of rotation.

Preferably said first and third axis of rotation are (substantially) perpendicular (and incident) to each other in at least one configuration of said machine. Preferably all said first, second and third axis of rotation cross each other at a point arranged in a substantially central region of said mould when secured to said actuation system. In this way the rotation of the mould about each one of the three axes is balanced as each one of the three axes of rotation passes substantially through a centre of the mould (i.e. the centre of rotation of the mould about the three axes is inside to the mould).

Preferably said support arm and/or said movable frame is/are rotationally fixed to perform, given a same rotation direction, any number of complete rotations about the respective axis of rotation. Preferably said actuation system is structured to rotate said mould, given a same direction of rotation, with any number of complete rotations about said third axis of rotation.

With the expression "any number of complete rotations" referred to the rotation of an element about its own axis of rotation, it is meant that this element can sweep, given a same direction of rotation, any angle, and therefore that the element can perform an indefinite number of complete rotations (n*360°). Preferably said rotations of said support arm, movable frame, and mould are independent from each other. In this way it is possible to rotate these elements in different ways, for example with the complete (n*360°) and simultaneous rotation of all three, or with the complete rotation of only two, or one, of them.

Preferably said movable frame is rotationally fixed to said support arm at a same side of the second portion with respect to said first portion. In this way the first portion of the support arm faces towards the movable frame and, for example, it can support further elements of the machine that have to relate with the mould during the rotational moulding process (e.g. active cooling system of the mould, as will be better described later).

Preferably said movable frame is rotationally fixed to said support arm at an end of said second portion distal from said first portion. In this way the space available for the movable frame with respect to the support arm is maximized (said space being given, to allow the movable frame to rotate, by the distance between the second axis of rotation and the first portion).

Preferably said supporting portion is arranged at distal position from said second portion of the support arm (for supporting the rotation system).

Preferably said supporting portion, and more preferably the whole movable frame, has central symmetry with respect to said second axis of rotation. In this way the supporting portion (preferably the whole movable frame) is shaped in rational way to rotate about the second axis of rotation (e.g. not eccentric, to facilitate its own rotation, for example not to create imbalances during rotation and to optimize the overall encumbrances of rotation).

Preferably said supporting portion has in plan a circular shape or a shape that approximates a circumference by a polygonal shape having at least six sides (e.g. hexagonal, octagonal, dodecagonal, etc.). In this way, a large support surface is created for the rotation system.

In one embodiment, said supporting portion comprises a main development direction (e.g. it can be substantially rectangular or squared). In this way the weight of the movable frame is limited, making it easier to rotate.

Preferably a radius of a circumference in which said supporting portion is inscribed is substantially equal to a length of a useful portion of said second portion of the support arm which extends from said second axis of rotation up to said first portion of the support arm. In this way, the rotation space available for the movable frame is efficiently used. With the expression "substantially equal" referred to a first quantity with respect to a second quantity, it is meant that this first quantity is equal to the second quantity +/−15% of the second quantity, more preferably +/−10%.

Preferably said actuation system is removably fixed to said movable frame. Preferably said movable frame is structured to be able to directly and removably secure said mould (e.g. with the actuation system removed). In this way it is possible to adapt the machine to different rotational moulding production processes, for example by fixing the mould directly to the movable frame and exploiting only two rotational degrees of freedom (first and second axis of rotation).

Preferably said actuation system is structured to removably secure said mould. In this way it is possible to interchange the type of mould according to the object to be made.

Preferably said actuation system is structured to secure said mould only at a substantially central portion of said mould. In this way the progressive reduction of the useful volumes is further limited as the rotational degrees of freedom increase, since the mould can further exploit an entire useful dimension perpendicularly to the second axis of rotation, compatibly with its own rotation about this second axis of rotation (unlike, for example, an actuation system structured to secure the mould at the respective ends which would occupy useful space for the mould along such useful dimension perpendicular to the second axis of rotation). Furthermore, in this way the ends of the mould remain free to allow, given a mould equipped with at least one openable end, the extraction of the finished product (according to the shape of the finished product, e.g. taking into account any undercuts).

Preferably said actuation system comprises a base structure which develops away from said supporting portion of said movable frame, more preferably substantially parallelly to said second axis of rotation. This base structure allows supporting the mould during the use of the machine.

Preferably said base structure has central symmetry with respect to said second axis of rotation. Preferably said actuation system, more preferably said base structure, is arranged at a substantially central portion of said movable frame. In this way the actuation system (the base structure) is arranged in rational way to facilitate its own rotation about the second axis (e.g. by limiting imbalances and/or inertia of rotation).

In one embodiment said base structure comprises a first and a second supporting portion arranged at mutually opposite sides of said movable frame. In this way, for example, it is possible to support the mould at two distinct regions of the mould separated from each other.

Preferably said actuation system comprises a fixed element, rigidly fixed to (or integral with) said base structure, and a rotating element rotationally coupled to said fixed element to rotate with respect to said fixed element about said third axis of rotation and structured to rigidly (preferably removably) secure said mould. In this way the rotating element rotates the mould when secured to it.

Preferably said actuation system comprises a motor rigidly fixed to said base structure and mechanically connected to said rotating element to rotate said rotating element about said third axis of rotation. In this way the actuation system actuating the mould is rational.

Preferably said fixed element has annular shape about a (respective) axis coinciding with said third axis of rotation and it is shaped to surround said mould. In this way the fixed element provides a rotation guide for the rotating element and it does not interfere with the mould.

Preferably said rotating element has annular shape about a (respective) axis coinciding with said third axis of rotation and it is shaped to surround said mould. In this way securing points for the mould are provided distributed (e.g. equally spaced) around the mould itself, to facilitate its securing. For example, the fixed element and the rotating element are two coaxial rings, the rotating element being rotationally fitted to the fixed element (e.g. the fixed and rotating element constitute the two annular portions of a fifth wheel). Furthermore, the fixed element and the rotating element shaped to surround the mould allow the mould to be secured to the rotating element and at the same time to extend on both sides with respect to the two elements to achieve the aforementioned securing only at a substantially central portion.

Preferably said rotating element comprises a toothed wheel mechanically coupled to a pinion of said motor. In this way the coupling is simple.

Preferably said base structure comprises a through opening having development substantially parallel to said third axis of rotation. Preferably said rotating element is arranged at said through opening, more preferably at an edge of said through opening. Preferably said through opening is shaped to house said mould in rotation when rigidly secured to said rotating element. In this way the base structure supports the mould without hindering its extension.

Preferably said machine comprises a plurality of slip ring systems for transferring electrical signals from said fixed frame to said mould when secured to said actuation system.

Preferably said machine comprises a first slip ring system operatively interposed between said fixed frame and said support arm, more preferably at a fixing region of said first portion of said support arm to said fixed frame.

Preferably said machine comprises a second slip ring system operatively interposed between said support arm and said movable frame, more preferably at a fixing region of said movable frame to said second portion of the support arm.

Preferably said machine comprises a static portion of a third slip ring system, said third slip ring system being operatively interposed between said actuation system and said mould when secured to said actuation system.

By the expression "slip ring system" it is meant an electromechanical system comprising a static portion and a rotating portion mutually electrically coupled to allow the transmission of electrical signals continuously from the static portion to the rotating portion, or vice versa, for any angular position of the rotating portion with respect to the static portion. The electrical signals transmitted are typically used for transmitting power to, and/or operating commands for, one or more parts of the machine. For example, each slip ring system can be of the type: with conductive blocks, with liquid metals, with brushes, contactless (wireless, which exploits the capacitive coupling between two plates of a capacitor, or the inductive coupling between two coils).

Preferably said machine comprises an active cooling system structured to cool said mould. In this way the cooling of the mould is facilitated and the cycle time decreased.

Preferably said active cooling system is fixed to said first portion of said support arm. Preferably said active cooling system comprises a plurality of fans structured to direct a respective jet of air towards a respective portion of said mould when secured to said actuation system. In this way the mould is cooled by forced convection, in a simple way, without contact and without structural complications of the structure of the mould and/or of the machine (e.g. ducts made on and/or in the mould to cool the mould by means of a refrigerant fluid and/or electrical resistances arranged along the mould to cool the mold by Peltier effect).

According to an aspect the invention relates to a set comprising said rotational moulding machine according to the present invention and a mould secured to said actuation system to rotate about said first, second and third axis of rotation.

Preferably said mould comprises a securing element (e.g. a flange) arranged at a substantially central portion of said mould and structured to (removably) secure said mould to said actuation system, more preferably to said rotating element. In this way the mould is suitably shaped to allow its aforesaid securing only at a substantially central position.

Preferably said mould comprises a main development direction. For example, the mould has substantially cylindrical shape. These types of moulds are typically used in combination with rotational moulding machines for making tanks and/or reservoirs, for example for water or gas (e.g. with the dimension of the mould along the main development direction much greater than the remaining dimensions). A further example provides the mould shaped for the production of canoes and/or kayaks.

Preferably, with said mould secured to said actuation system, said main development direction of said mould is parallel to said third axis of rotation. In this way the imbalances during rotation are limited.

Preferably said mould comprises a rotating portion of the third slip ring system electrically connected to the static portion for realizing said third slip ring system. In this way the electrical signals can pass from the machine to the mould.

In one embodiment said mould comprises at least one respective openable end, more preferably respective openable ends arranged at opposite sides with respect to said main development direction. In this way, for example, it is possible to remove the finished product from the mould by extracting it through the open end. Through one or both the openable ends it is also possible to arrange inside the mould any inserts that will be co-moulded together with the finished product during the moulding cycle. The rotational moulding machine of the present invention comprising the actuation system structured to secure the mould only at a substantially central portion of the mould (together with the mould comprising the securing element at a substantially central portion thereof) is particularly useful in the use of moulds comprising at least one openable end as both the opening and closing of the latter, and the extraction of the finished product, are not hindered by the actuation system (e.g. in comparison with an actuation system structured to secure the mould at the respective ends).

In one embodiment said mould comprises a first and a second half-mould distinct to each other along a separation plane parallel to said main development direction. Moulds of this type can be commonly used for the construction of canoes or kayaks. In this case, the rotational moulding machine according to the present invention allows to limit (i.e. by limiting and/or eliminating, as described above, the progressive reduction of the useful volumes as the rotational degrees of freedom increase) the geometric constraints relative to the length of the mould along the main development direction, and therefore to be able to produce finished products having large dimensions in a simple and/or rapid way.

BRIEF DESCRIPTION OF THE DRAWINGS

The features and the advantages of the present invention will be further clarified by the following detailed description of some embodiments, presented by way of non-limiting example of the present invention, with reference to the attached figures, in which.

DETAILED DESCRIPTION OF SOME EMBODIMENTS OF THE INVENTION

In the figures, the number 99 globally indicates a set comprising a rotational moulding machine 1 and a mould 20.

Exemplarily the machine 1 comprises a fixed frame 2 stably fixed to a surface (not shown) supporting the machine.

Figure 2:
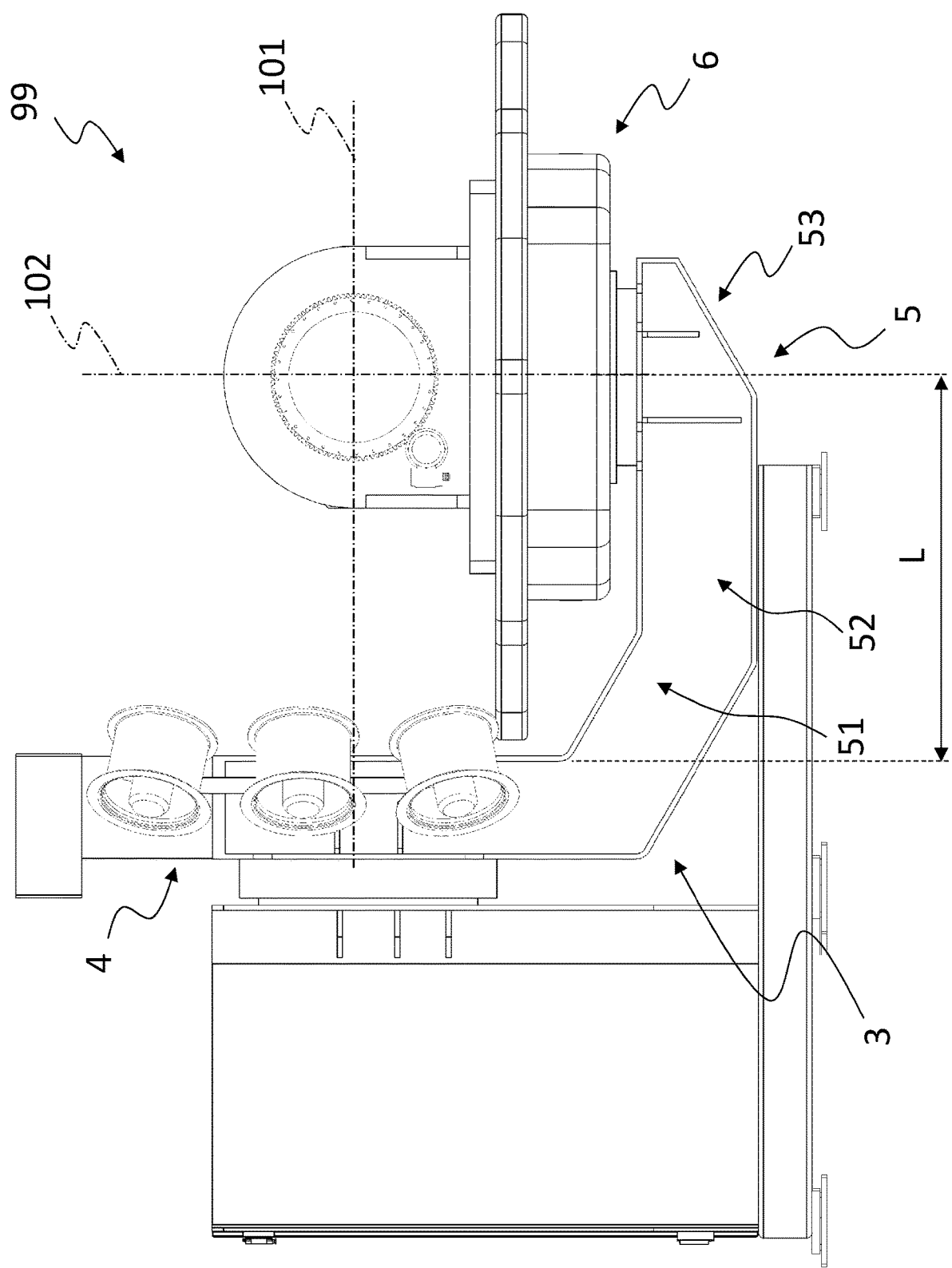
FIG. 2 shows a side view of the set of FIG. 1.

Exemplarily the machine comprises a support arm 3 having a substantially L-shaped profile and comprising a first portion 4 and a second portion 5 rigidly joined together (FIG. 2).

Exemplarily the support arm 3 is rotationally fixed to the fixed frame 2 only at the first portion 4 to rotate about a horizontal first axis of rotation 101, wherein the second portion 5 extends protruding from the first portion 4 substantially parallel to the first axis of rotation 101 and away from the fixed frame 2.

Exemplarily the first portion 4 is rectilinear and the second portion 5 comprises a first tract 51 inclined with respect to the horizontal direction and a second tract 52 arranged horizontally (FIG. 2).

Exemplarily the machine 1 comprises a movable frame 6 rotationally fixed to the support arm 3 only at one end 53 of the second portion 5 distal from the first portion 4 to rotate about a second axis of rotation 102 perpendicular to the first axis of rotation 101.

Exemplarily the support arm 3 and the movable frame 6 are rotationally fixed to perform, given a same direction of rotation, any number of complete rotations about the respective axis of rotation (i.e. being able to perform an indefinite number of continuous rotations $-n*360°$—about the respective axis of rotation). Exemplarily the rotations of the support arm and of the movable frame are independent from each other and the direction of rotation can be any (e.g. also alternately clockwise-counter clockwise).

Exemplarily the movable frame 6 is rotationally fixed to the support arm 3 at a same side of the second portion 5 with respect to the first portion 4.

Exemplarily the movable frame 6 comprises a supporting portion 7 which lies in a plane perpendicular to the second axis of rotation 102 and it is arranged at distal position from the second portion 5 of the support arm 3 (i.e. at extremal position moving away from the second portion).

Exemplarily the whole movable frame 6 has central symmetry with respect to the second axis of rotation 102, to be balanced in rotation and optimize the overall encumbrances of rotation, and the supporting portion 7 has in plan a shape that approximates a circumference by a polygonal shape having sixteen sides (hexadecagon).

In one embodiment (not shown) the supporting portion comprises a main development direction, for example it can be substantially rectangular to limit the overall weight of the movable frame, facilitating its rotation.

Exemplarily a radius R (FIG. 3) of a circumference in which the supporting portion 7 is inscribed is substantially equal to a length L of a useful portion of the second portion 5 of the support arm which extends from the second axis of rotation 102 up to the first portion 4 of the support arm to efficiently exploit the rotation space available for the movable frame. This circumference, given the central symmetry of the supporting portion, is exemplarily centred in the second axis of rotation.

Exemplarily, the machine 1 comprises an actuation system 8 rigidly fixed to the movable frame 6 at the supporting portion 7, the actuation system 8 being structured to secure the mould 20 and to rotate the mould 20 about a third axis of rotation 103 perpendicular to the second axis of rotation 102.

Figure 1:
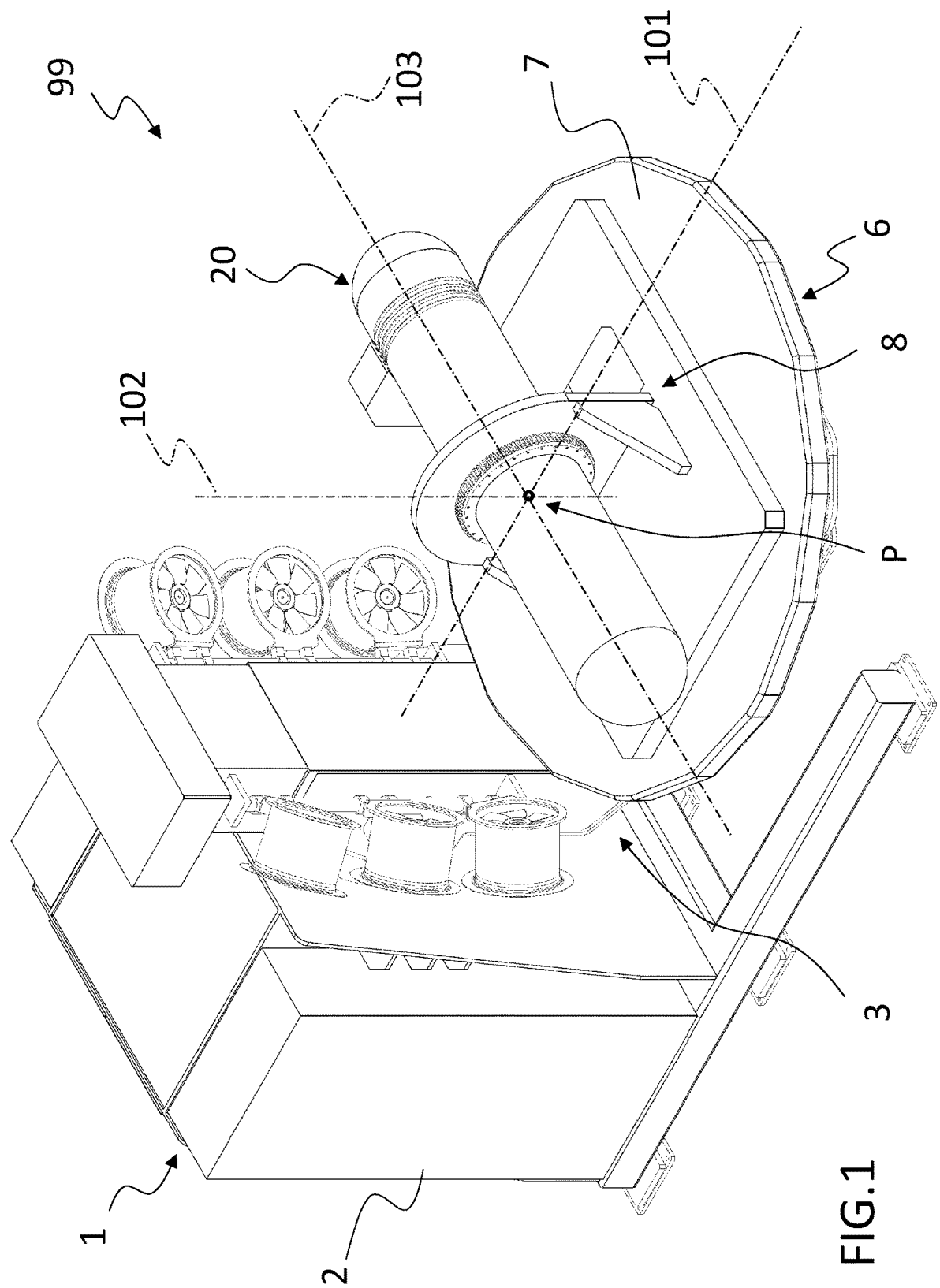
FIG. 1 shows a perspective view of a set comprising a rotational moulding machine according to the present invention and a mould.

Exemplarily (FIG. 1) the first 101 and the third axis of rotation 103 are perpendicular to each other and mutually incident in at least one configuration of the machine 1, and the first 101, second 102 and third axis of rotation 103 all cross a same point P arranged in a substantially central region of the mould 20 when secured to the actuation system 8.

Exemplarily the actuation system 8 is structured to rotate the mould 20, given a same direction of rotation, with any number of complete rotations about the third axis of rotation 103.

Exemplarily the actuation system 8 is removably fixed to the movable frame 6 and the movable frame 6 is structured (not shown) to be able to directly and removably secure the mould 20, to be able to adapt the machine to different rotational moulding production processes, for example using only two rotational degrees of freedom (first and second axis of rotation).

In one embodiment (not shown) the actuation system is firmly fixed to the movable frame (e.g. in a single piece with the movable frame) to simplify the structure of the machine.

Figure 3:
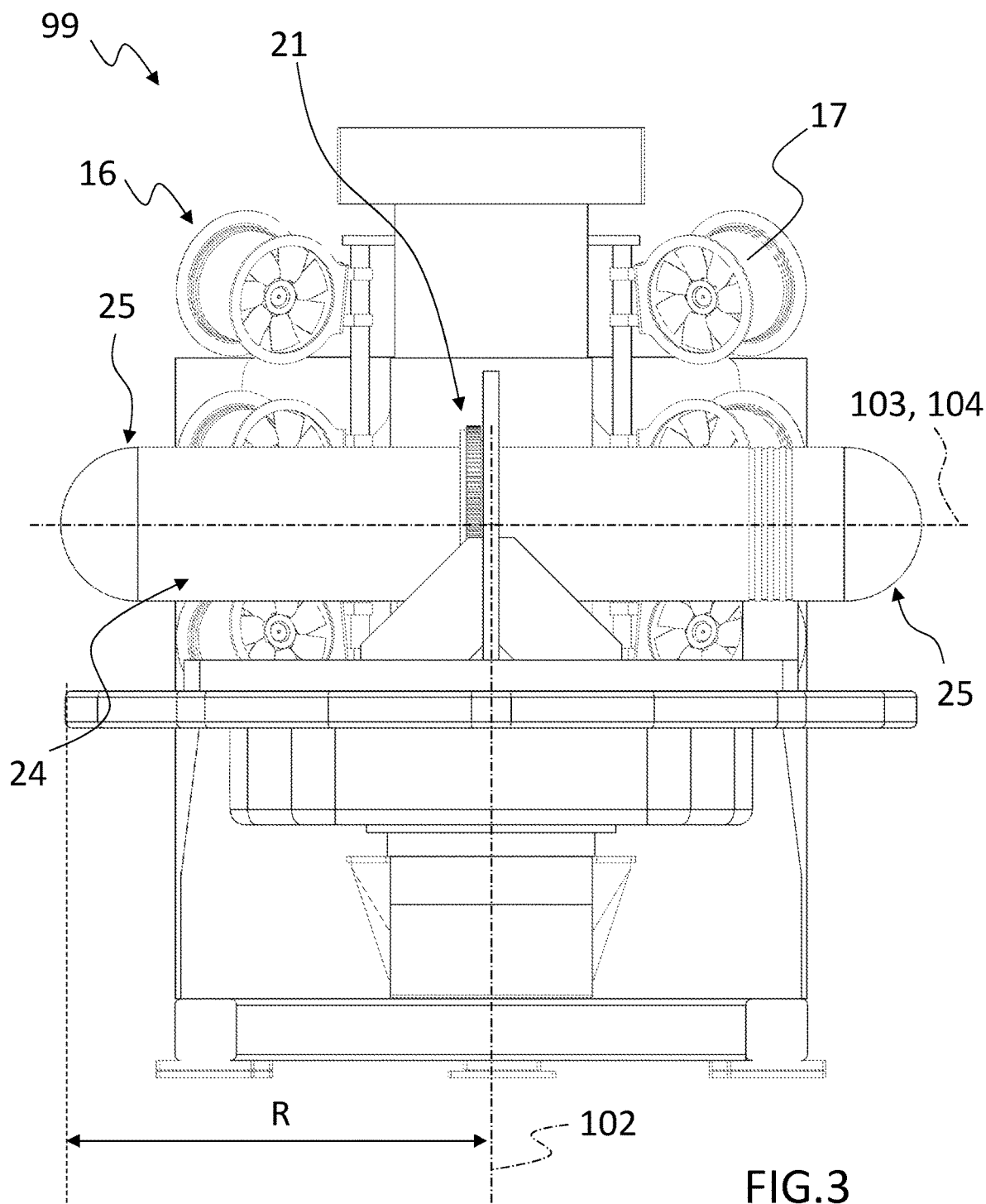
FIG. 3 shows a front view of the set of FIG. 1.

Exemplarily the actuation system 8 is structured to secure the mould 20 removably and only at a substantially central portion 21 of the mould (FIG. 3).

In one embodiment (not shown), the actuation system can be structured to secure the mould at a substantially peripheral region of the mould (in other words, the mould is cantilevered secured to the actuation system asymmetrically with respect to the actuation system itself).

Figure 4:
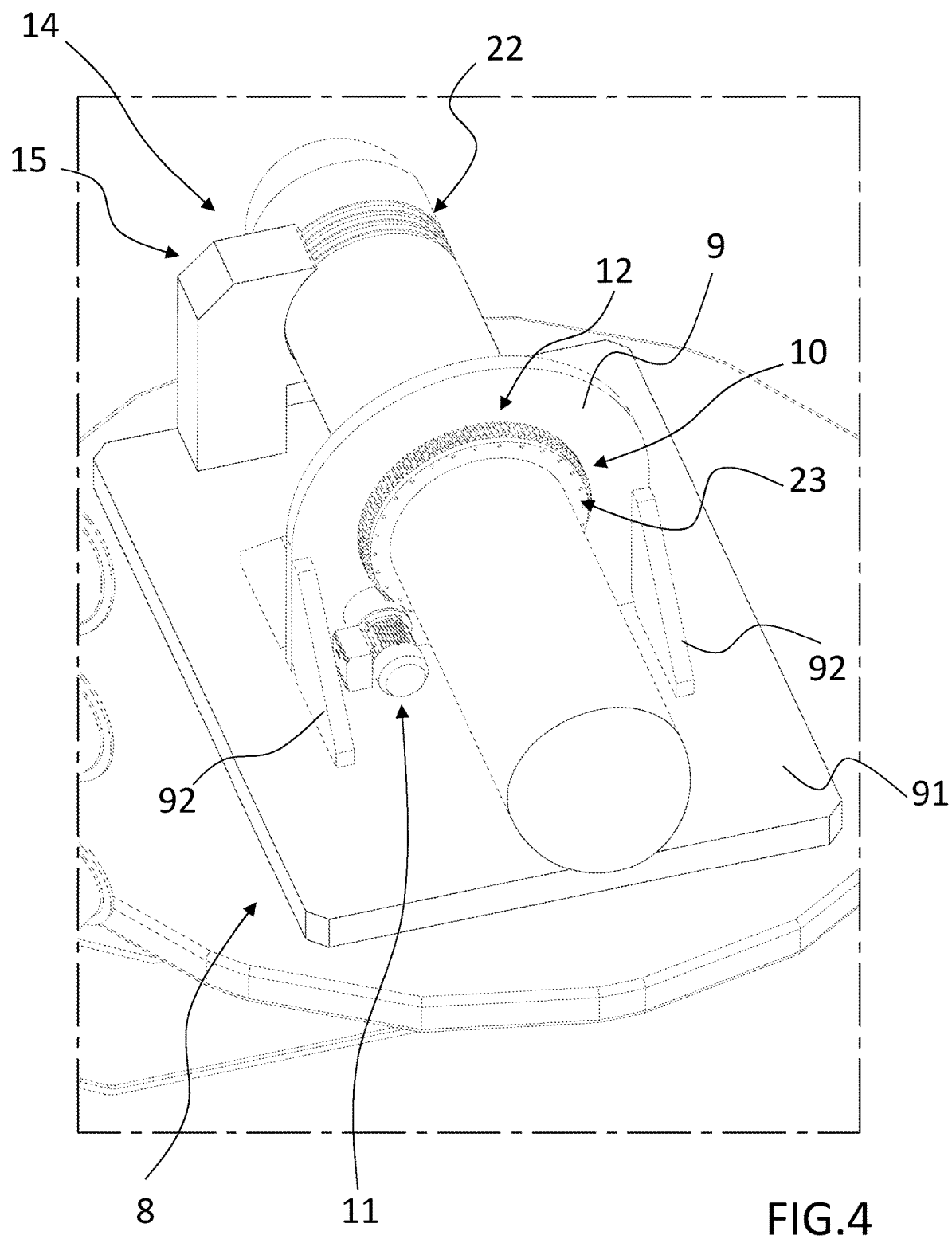
FIG. 4 shows a detail of the set of FIG. 1.

Exemplarily (FIG. 4) the actuation system 8 comprises a support plane 91, arranged on the supporting portion 7 parallel to the latter, and a base structure 9 which develops away from the supporting portion 7 parallel to the second axis of rotation 102. Exemplarily the base structure 9 is arranged at a substantially central portion of the movable frame (exemplarily the second axis of rotation 102 crosses the base structure).

Exemplarily (FIG. 4) the base structure 9 has central symmetry with respect to the second axis of rotation 102 and has a substantially planar development (with the exception of a pair of support elements 92 arranged perpendicularly to the base structure).

Exemplarily (FIG. 4) the actuation system 8 comprises a fixed element (not shown), rigidly fixed to the base structure 9, and a rotating element 10 rotationally coupled to the fixed element to rotate about the third axis of rotation 103 with respect to the fixed element and structured for rigidly and removably securing the mould (e.g. by means of a plurality of attachment points to which the mould is fixed, for example bolted).

Exemplarily the fixed element and the rotating element 10 have annular shape about a respective axis coinciding with the third axis of rotation 103 and they are shaped to surround the mould 20. Exemplarily the fixed element and the rotating element 10 constitute the two annular portions of a fifth wheel (i.e. a type of axial bearing), with the rotating element 10 exemplarily fitted externally to the fixed element. The actuation system exemplarily further comprises (not shown) a plurality of rotation elements (e.g. spheres or cylinders all having respective axis parallel to the third axis of rotation) arranged in continuous succession at an interface between the fixed element and the rotating element 10 to facilitate the rotation thereof.

Exemplarily the actuation system 8 comprises a motor 11 rigidly fixed to the base structure 9 and mechanically connected to the rotating element 10 to rotate the rotating element 10 about the third axis of rotation. Exemplarily the rotating element 10 comprises a toothed wheel 12 arranged at radially external position of the rotating element and mechanically coupled to a pinion (not shown) of the motor 11.

Exemplarily the basic structure 9 comprises a through opening (in the figures occupied by the mould) having development substantially parallel to the third axis of rotation 103.

Exemplarily the rotating element 10 is arranged at an edge of the through opening and the through opening is shaped to house (as shown) the mould 20 in rotation when rigidly fixed to the rotating element, not to hinder the extension of the mould.

Exemplarily the machine 1 comprises a plurality of slip ring systems for transferring electrical signals from the fixed frame 2 to the mould 20 when secured to the actuation system 8. More in detail, the machine 1 exemplarily comprises a first slip ring system (not shown) operatively interposed between the fixed frame 2 and the support arm 3 at a fixing region of the first portion 4 of the support arm 3 to the fixed frame 2.

Exemplarily the machine 1 comprises a second slip ring system (not shown) operatively interposed between the support arm 3 and the movable frame 6 at a fixing region of the movable frame 6 to the second portion 5 of the support arm.

Exemplarily (FIG. 4) the machine 1 comprises a static portion 15 (only schematically shown) of a third slip ring system 14, the third slip ring system 14 being operatively interposed between the actuation system 8 and the mould 20 when secured to the actuation system.

Exemplarily the machine 1 comprises an active cooling system 16 fixed to the first portion 4 of the support arm 3 and structured to cool the mould. Exemplarily the active cooling system 16 comprises a plurality of fans 17 (exemplarily six) structured to direct a respective jet of air towards a respective portion of the mould when secured to the actuation system.

Exemplarily the mould 20 is secured to the actuation system 8 (to the rotating element 10 of the actuation system 8) to rotate about the first 101, the second 102 and the third axis of rotation 103. Exemplarily the mould 20 comprises a rotating portion 22 (for example a plurality of conductive tracks) of the third slip ring system 14 electrically connected to the static portion 15 to realize the third slip ring system 14 when the mould is secured to the actuation system 8.

Exemplarily the mould 20 comprises a securing element 23 (for example an annular flange) arranged at the substantially central portion 21 of the mould 20 and structured to removably secure the mould to the rotating element 10. In the shown example the flange is bolted to the rotating element along an entire annular development.

Exemplarily (FIG. 3) the mould 20 comprises a main development direction 104 arranged, with the mould 20 secured to the actuation system 8, parallel to the third axis of rotation 103.

Exemplarily (FIG. 3) the mould comprises a cylindrical central portion 24 having axis parallel to the main development direction 104 and respective openable ends 25 (schematically shown) having spherical cap shape and arranged at opposite sides with respect to the main development direction. Exemplarily the external surface of the mould has central symmetry with respect to the third axis of rotation 103 and the main development direction 104 lies on the third axis of rotation 103.

In use, the set 99 exemplarily allows to perform a rotational moulding process for making cylindrical tanks, typically for water. The openable ends 25 of the mould allow to arranged inside the mould any inserts (e.g. metal reinforcing elements) which will be co-moulded together with the finished product during the moulding cycle, as well as to extract the finished product at the end of the cycle (given the absence of undercuts of the tank).

The securing of the mould to the actuation system only at the substantially central portion 21 of the mould does not hinder the movement of the end portions, allowing them to be opened and closed without having to move the entire mould and/or other parts of the machine, and it allows to extract the finished product leaving the mould in position (e.g. secured to the actuation system) for the next moulding cycle, thus decreasing the cycle time.

Furthermore, the actuation system structured to secure the mould only at the substantially central portion 21 allows to further limit the reduction of the useful volumes as the rotational degrees of freedom given to the mould increase. In fact, the mould can thus further exploit a whole useful dimension perpendicularly to the second axis of rotation 102 (compatibly with the rotation of the mould about the second axis of rotation). This useful dimension is essentially equal to the diameter of the circumference in which the supporting portion 7 is inscribed (FIG. 3).

It is noted that, with reference to a comparative machine similar to the machine according to the present invention (e.g. having similar dimensions and overall encumbrances) but without the actuation system (i.e. having only the first and the second axis of rotation), to rotate a mould about a respective main development direction, it is necessary to arrange the mould directly secured to the supporting portion and with the main development direction arranged substantially coincident with the second axis of rotation. In this configuration, the useful dimension along the second axis of rotation that can be used by the mould is substantially equal to the distance between the supporting portion and the end of the first portion of the support arm (distal from the second portion), since the mould must necessarily be contained in the rotation encumbrance of the first portion of the support arm. Furthermore, if the mould comprises both respective openable ends, this useful dimension parallel to the second axis of rotation is further reduced since it is necessary to clear space near the supporting portion in order to open the end proximal to the movable frame (therefore the mould is spaced away from the supporting portion). It follows that the useful length for the mould along the second axis of rotation 102 in the comparative machine is less than the useful length for the mould along the third axis of rotation 103 according to the present invention (see FIG. 3). Therefore, the machine according to the present invention allows both to perform the rotation about the three axes, and alternatively to lock the axis of rotation 102 and assume a configuration in which there are used only the rotations about the axes 101 and 103, said axes being kept perpendicular to each other (e.g. a back and forth oscillation about axis 101 combined with a continuous rotation about axis 103, in the jargon known as 'rock and roll'), but with a mould longer than in the case of the aforementioned comparative machine without the axis 103 and in which the mould must be arranged parallel to the axis of rotation 102 to perform the aforementioned rock and roll.

What is claimed is:

1. A rotational moulding machine, the machine comprising:
   a fixed frame;
   a support arm comprising a first and a second portion rigidly joined together, said support arm being rotationally fixed to said fixed frame only at said first portion to rotate about a first axis of rotation arranged substantially horizontal, wherein said second portion develops protruding from the first portion in a direction extending substantially parallel to said first axis of rotation;
   a movable frame rotationally fixed to said support arm at said second portion to rotate about a second axis of rotation substantially perpendicular to said first axis of rotation, said movable frame comprising a supporting portion which lies in a plane substantially perpendicular to said second axis of rotation; and
   an actuation system rigidly fixed to said movable frame at said supporting portion, said actuation system being structured to secure a mould and rotate said mould about a third axis of rotation substantially perpendicular to said second axis of rotation.

2. The machine according to claim 1, wherein said support arm has a substantially L-shaped profile, wherein said first and third axis of rotation are substantially perpendicular to each other in at least one configuration of said machine, and wherein all of said first, second, and third axis of rotation cross each other at a point arranged in a substantially central region of said mould when said mould is secured to said actuation system.

3. The machine according to claim 1, wherein said support arm and/or said movable frame is/are rotationally fixed to perform, given a same rotation direction, any number of complete rotations about their respective axis of rotation, and wherein said actuation system is structured to rotate said mould, given a same direction of rotation, with any number of complete rotations about said third axis of rotation.

4. The machine according to claim 1, wherein said movable frame is rotationally fixed to said support arm at a same side of the second portion with respect to said first portion and at an end of said second portion distal from said first portion, wherein said supporting portion is arranged on said movable frame at distal position from said second portion of the support arm, wherein said supporting portion has central symmetry with respect to said second axis of rotation and has in plan a circular shape or a shape that approximates a circumference by a polygonal shape having at least six sides, and wherein a radius of a circumference in which said supporting portion is inscribed is substantially equal to a length of a useful portion of said second portion of the support arm which extends from said second axis of rotation up to said first portion of the support arm.

5. The machine according to claim 1, wherein said actuation system is removably fixed to said movable frame, wherein said actuation system is arranged at a substantially central portion of said movable frame, wherein said movable frame is structured to be able to directly and removably secure said mould in a configuration of the machine with the actuation system removed, and wherein said actuation system is structured to secure said mould removably and only at a substantially central portion of said mould.

6. The machine according to claim 1, wherein said actuation system comprises a base structure which develops away from said supporting portion of said movable frame, wherein said base structure has central symmetry with respect to said second axis of rotation, wherein said actuation system comprises a fixed element rigidly fixed to said base structure and a rotating element rotationally coupled to said fixed element to rotate with respect to said fixed element about said third axis of rotation and structured to rigidly secure said mould, and wherein said actuation system comprises a motor rigidly fixed to said base structure and mechanically connected to said rotating element to rotate said rotating element about said third axis of rotation.

7. The machine according to claim 6, wherein said fixed element has annular shape about a respective axis coinciding with said third axis of rotation and is shaped to surround said mould, wherein said rotating element has annular shape about a respective axis coinciding with said third axis of rotation and is shaped to surround said mould, wherein said rotating element comprises a toothed wheel mechanically coupled to a pinion of said motor, wherein said base structure comprises a through opening having development extending substantially parallel to said third axis of rotation, wherein said rotating element is arranged at said through opening, and wherein said through opening is shaped to house said mould in rotation with said mould rigidly secured to said rotating element.

8. The machine according to claim 7, wherein said rotating element is arranged at an edge of said through opening.

9. The machine according to claim 6, wherein said base structure develops away from said supporting portion of said movable frame in a direction extending substantially parallel to said second axis of rotation.

10. The machine according to claim 6, wherein said rotating element is structured to rigidly and removably secure said mould.

11. The machine according to claim 1, further comprising a plurality of slip ring systems for transferring electrical signals from said fixed frame to said mould when said mould is secured to said actuation system, wherein said plurality of slip ring systems comprises a first slip ring system operatively interposed between said fixed frame and said support arm, a second slip ring system operatively interposed between said support arm and said movable frame, and a static portion of a third slip ring system, said third slip ring system being operatively interposed between said actuation system and said mould when said mould is secured to said actuation system, wherein said machine comprises an active cooling system fixed to said first portion of said support arm and structured to cool said mould, and wherein said active cooling system comprises a plurality of fans structured to direct a respective jet of air towards a respective portion of said mould when said mould is secured to said actuation system.

12. A set comprising the rotational moulding machine according to claim 1 and said mould secured to said actuation system to rotate about said first, second, and third axis of rotation.

13. The set according to claim 12, wherein said mould comprises a securing element arranged at a substantially central portion of said mould and structured to secure said mould to said actuation system, wherein said mould comprises a main development direction, wherein, with said mould secured to said actuation system, said main development direction of said mould is parallel to said third axis of rotation, wherein said mould comprises a rotating portion of a slip ring system operatively interposed between said actuation system and said mould, said rotating portion being electrically connected to a static portion of the slip ring system for realizing said slip ring system, and wherein said mould comprises at least one respective openable end or wherein said mould comprises a first and a second half-mould distinct to each other along a separation plane parallel to said main development direction.

14. The set according to claim 13, wherein said mould comprises respective openable ends arranged at opposite sides thereof with respect to said main development direction.

\* \* \* \* \*